United States Patent
Sampath et al.

(10) Patent No.: US 8,971,461 B2
(45) Date of Patent: *Mar. 3, 2015

(54) CQI AND RANK PREDICTION FOR LIST SPHERE DECODING AND ML MIMO RECEIVERS

(75) Inventors: Hemanth Sampath, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1715 days.

This patent is subject to a terminal disclaimer.

(21) Appl. No.: 11/441,652

(22) Filed: May 25, 2006

(65) Prior Publication Data

US 2007/0010957 A1 Jan. 11, 2007

Related U.S. Application Data

(60) Provisional application No. 60/686,646, filed on Jun. 1, 2005, provisional application No. 60/691,722, filed on Jun. 16, 2005.

(51) Int. Cl.
*H04L 1/00* (2006.01)
*H04B 7/12* (2006.01)
(Continued)

(52) U.S. Cl.
CPC ............... *H04B 7/12* (2013.01); *H04B 1/1027* (2013.01); *H04B 7/0417* (2013.01); *H04B 7/063* (2013.01);
(Continued)

(58) Field of Classification Search
CPC .... H04B 7/0602; H04B 7/0608; H04B 7/061; H04B 7/0691; H04L 2025/03426
USPC ......... 375/219, 221, 260, 262, 265, 267, 316, 375/347, 227, 346; 455/24, 69, 513
See application file for complete search history.

(56) References Cited

U.S. PATENT DOCUMENTS 6,351,499 B1 2/2002 Paulraj et al.
6,893,748 B2 5/2005 Bertero et al.
(Continued)

FOREIGN PATENT DOCUMENTS

EP 1566917 A2 8/2005
JP 2007506307 3/2007
(Continued)

OTHER PUBLICATIONS

Gore et al. "Near-Optimal Selection of Transmit Antennas for a MIMO Channel Based on Shannon Capacity", IEEE, Oct./Nov. 2000.*
(Continued)

*Primary Examiner* — Sophia Vlahos
(74) *Attorney, Agent, or Firm* — Howard Seo

(57) ABSTRACT

Systems and methodologies are described that facilitate integrating a list-sphere decoding design in a multiple input-multiple output (MIMO) wireless communication environment. According to various aspects, optimal rank selection and CQI computation for an optimal rank can be performed in conjunction with a non-linear receiver, such as a maximum life (ML) MMSE receiver, a non-linear receiver with a list-sphere decoder, and the like. Optimal rank selection can be performed using a maximum rank selection protocol, a channel capacity-based protocol, or any other suitable protocol that facilitates rank selection, and CQI information can be generated based in part on effective SNRs determined with regard to a selected optimal rank.

28 Claims, 13 Drawing Sheets

(51) Int. Cl.
| | |
|---|---|
| *H04B 1/10* | (2006.01) |
| *H04B 7/04* | (2006.01) |
| *H04B 7/06* | (2006.01) |
| *H04L 1/06* | (2006.01) |
| *H04L 25/03* | (2006.01) |

(52) U.S. Cl.
CPC ............ *H04B 7/0632* (2013.01); *H04L 1/0026* (2013.01); *H04L 1/0675* (2013.01); *H04L 25/03242* (2013.01); *H04L 1/0656* (2013.01); *H04L 2025/03426* (2013.01)
USPC ........... 375/346; 375/227; 375/260; 375/267; 455/24; 455/513

(56) References Cited

U.S. PATENT DOCUMENTS

| | | | | |
|---|---|---|---|---|
| 6,917,820 | B2* | 7/2005 | Gore et al. ................ | 455/562.1 |
| 7,120,199 | B2* | 10/2006 | Thielecke et al. ............ | 375/267 |
| 7,120,395 | B2 | 10/2006 | Tong et al. | |
| 7,139,328 | B2 | 11/2006 | Thomas et al. | |
| 7,154,960 | B2* | 12/2006 | Liu et al. ....................... | 375/267 |
| 7,317,771 | B2 | 1/2008 | Brunel | |
| 7,336,727 | B2 | 2/2008 | Mukkavilli et al. | |
| 7,352,819 | B2 | 4/2008 | Lakshmipathi et al. | |
| 7,428,269 | B2 | 9/2008 | Sampath et al. | |
| 7,519,022 | B2 | 4/2009 | Yu et al. | |
| 7,782,981 | B2* | 8/2010 | Dean et al. .................... | 375/316 |
| 2002/0056066 | A1* | 5/2002 | Gesbert et al. ................ | 714/759 |
| 2002/0110138 | A1* | 8/2002 | Schramm ...................... | 370/430 |
| 2003/0003863 | A1 | 1/2003 | Thielecke et al. | |
| 2003/0068994 | A1 | 4/2003 | Sayeed et al. | |
| 2003/0157954 | A1* | 8/2003 | Medvedev et al. ............ | 455/522 |
| 2003/0235147 | A1 | 12/2003 | Walton et al. | |
| 2003/0236080 | A1* | 12/2003 | Kadous et al. ............. | 455/226.1 |
| 2004/0058687 | A1 | 3/2004 | Kim et al. | |
| 2004/0186985 | A1 | 9/2004 | Tran et al. | |
| 2005/0008091 | A1 | 1/2005 | Boutros et al. | |
| 2005/0063378 | A1 | 3/2005 | Kadous | |
| 2005/0182994 | A1* | 8/2005 | Ashikhmin et al. .......... | 714/748 |
| 2005/0227697 | A1* | 10/2005 | Borst et al. .................... | 455/450 |
| 2005/0237971 | A1* | 10/2005 | Skraparlis ..................... | 370/329 |
| 2006/0002414 | A1 | 1/2006 | Du et al. | |
| 2006/0023745 | A1* | 2/2006 | Koo et al. ...................... | 370/468 |
| 2012/0044982 | A1 | 2/2012 | Sampath et al. | |

FOREIGN PATENT DOCUMENTS

| | | |
|---|---|---|
| JP | 2007507913 | 3/2007 |
| KR | 1020050034476 | 4/2005 |
| TW | 571525 B | 1/2004 |
| WO | WO2004088908 | 10/2004 |

OTHER PUBLICATIONS

Sandhu et al. "Near-Optimal Selection of Transmit Antennas for a MIMO Channel Based on Shannon Capacity", IEEE, Oct./Nov. 2000 and.*
Heath et al. "Antenna Selection for Spatial Multiplexing System with Linear Receivers", Apr. 2001, IEEE, pp. 142-144.*
Gorokhov et al. "Transmit/Receive MIMO antenna subset selection", May 2004, IEEE.*
Galli "Non-linear MMSE estimation and SbS-MAP receivers", Jun. 2000, IEEE.*
Molisch et al. "MIMO systems with Antenna Selection", IEEE, Mar. 2004.*
Tetsushi et al., "A Hybrid MIMO System Using Spatial Correlation" Oct. 2002 IEEE (whole document).
Boutrous et al., "Soft-input soft-output lattice sphere decoder for linear channels" IEEE Dec. 2003 (whole document).
International Search Report—PCT/US06/21583, International Search Authority—European Patent Office—Oct. 25, 2007.
Complexity-reduced Maximum Likelihood Detection Based on Replica Candidate Selection with QR Decomposition Using Pilot-Assisted Channel Estimation and Ranking for MIMO Multiplexing Using OFCDM, Technical Report of IEICE, RCS2003-312, Mar. 2004.
Electronics Information and Communication Engineers General Convention in 2004, B-5-42.
Gore, D. A., et al.: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, (Jun. 5, 2000), pp. 2785-2788, XP001035763, abstract.
Taiwan Search Report—Appl. No. 095119456, Jan. 8, 2010.
Written Opinion—PCT/US06/021583, International Search Authority, European Patent Office, Oct. 25, 2007.
Kavcic A., et al., "Equal-Diagonal QR Decomposition and its Application to Precoder Design for Successive-Cancellation Detection", IEEE Transactions on Information Theory, IEEE Press, USA, vol. 51, No. 1, Jan. 1, 2005, pp. 154-172, XP011124784, ISSN: 0018-9448, DOI: 10.1109/TIT.2004.842677.
Kim et al. "Space-time Technique for wireless multiuser MIMO Systems with SIC Receivers", Sep. 2004, IEEE, pp. 2013-2017.
Supplementary European Search Report—EP06772044—Search Authority—The Hague—Oct. 15, 2012.

* cited by examiner

US 8,971,461 B2

CQI AND RANK PREDICTION FOR LIST SPHERE DECODING AND ML MIMO RECEIVERS

CLAIM OF PRIORITY UNDER 35 U.S.C. §119

This application claims the benefit of U.S. Provisional Application Ser. No. 60/686,646 entitled "CQI AND RANK PREDICTION IN LIST SPHERE DECODING," filed on Jun. 1, 2005, and U.S. Provisional Application Ser. No. 60/691,722 entitled "A METHOD OF LIST SPHERE DECODING FOR MIMO RECEIVERS," filed on Jun. 16, 2005, both assigned to the assignee hereof and hereby expressly incorporated by reference herein.

BACKGROUND

I. Field

The following description relates generally to wireless communications, and more particularly to performing rank calculation in a non-linear receiver employed in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

Conventional wireless systems do not provide support adaptive communication techniques in non-linear receivers due to computational complexity, processing overhead, and the like. Thus, there exists a need in the art for a system and/or methodology of improving throughput in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with performing rank selection and CQI computation for a non-linear receiver, such as an ML-MMSE receiver, in a MIMO wireless communication environment. According to one aspect, a method of calculating rank in a non-linear receiver in a user device in a wireless communication environment can comprise receiving a transmission signal at a non-linear receiver, determining a rank for one or more layers of the transmission signal, and selecting a layer with an optimum rank that maximizes channel efficiency for transmissions. The method can further comprise employing a list-sphere decoding algorithm in the non-linear receiver to decode the received signal transmission. Additionally, a capacity-based rank selection protocol can be employed to determine rank of the received transmission, and at least one submatrix can be generated for each of the one or more layers. Transmission capacity for each of the at least one submatrices can be evaluated and averaged for each layer. The method can still further comprise identifying a rank for a layer with a highest average capacity, calculating a CQI, and feeding back the CQI and rank information using a reverse link control channel. The non-linear receiver can be a maximum life (ML) minimum mean-squared error (MMSE) non-linear receiver, and the wireless communication environment can be a multiple input-multiple output (MIMO) single code word (SWC) wireless communication environment.

Another aspect relates to a wireless communication apparatus that facilitates calculating rank in a non-linear receiver in a user device in a wireless communication environment can comprise a non-linear receiver that receives a signal with multiple layers, a memory that stores information related to rank calculation algorithms, and a processor coupled to the memory that employs a rank calculation algorithm to determine an optimum rank for at least one transmission layer in the received signal. The non-linear receiver can utilize a list-sphere decoding protocol to decode the received signal. The apparatus can further comprise a capacity mapping component that evaluates transmission capacity for at least one submatrix of at least one received layer, and a rank evaluation component that identifies an optimal rank associated with a received layer having a highest average transmission capacity. Additionally, the processor can generate a CQI report for transmission over a reverse link control channel and can append a 2-bit optimal rank identifier thereto.

Yet another aspect relates to a wireless communication apparatus, comprising means for means for performing a non-linear decoding protocol on a received multiple-layer signal at a user device, means for determining an optimal rank associated with at least one of the layers of the received signal, and means for transmitting information related to the optimal rank with CQI information over a reverse link control channel. The apparatus can additionally comprise means for performing a list-sphere decoding protocol to decode the received signal, means for generating a plurality of submatrices for each layer of the received signal and capacity mapping the submatrices, and means for determining an effective signal-to-noise ratio (SNR) for each submatrix. Moreover, the apparatus can comprise means for generating CQI information related to the received signal based at least in part on the effective SNR of a layer having the optimal rank. The means for transmitting can transmit CQI and rank information over the reverse link control channel approximately every 5 ms.

Still another aspect relates to a computer-readable medium having stored thereon computer-executable instructions for employing a non-linear decoding protocol in a user device to decode a received multiple-layer signal, identifying an optimal rank associated with at least one of the layers of the received signal, generating CQI information for the received signal based at least in part on the identified rank, and transmitting CQI and rank information over a reverse link control channel. The computer-readable medium can additionally comprise instructions for performing a list-sphere decoding protocol to decode the received signal, for generating a plurality of submatrices for each layer of the received signal and capacity mapping the submatrices, and for determining an effective signal-to-noise ratio (SNR) for each submatrix. Still furthermore, the computer-readable medium can comprise instructions for generating the CQI information based at least in part on the effective SNR of a layer having the optimal rank.

A further aspect provides for a processor that executes instructions for employing a non-linear decoding protocol in a user device to decode a received multiple-layer signal, identifying an optimal rank associated with at least one of the layers of the received signal, generating CQI information for the received signal based at least in part on the identified rank, and transmitting CQI and rank information over a reverse link control channel. The instructions can further comprise performing a list-sphere decoding protocol to decode the received signal, generating a plurality of submatrices for each layer of the received signal and capacity mapping the submatrices, and determining an effective signal-to-noise ratio (SNR) for each submatrix. The processor can additionally execute instructions for generating the CQI information based at least in part on the effective SNR of a layer having the optimal rank, and for transmitting CQI and rank information over the reverse link control channel approximately every 5 ms.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
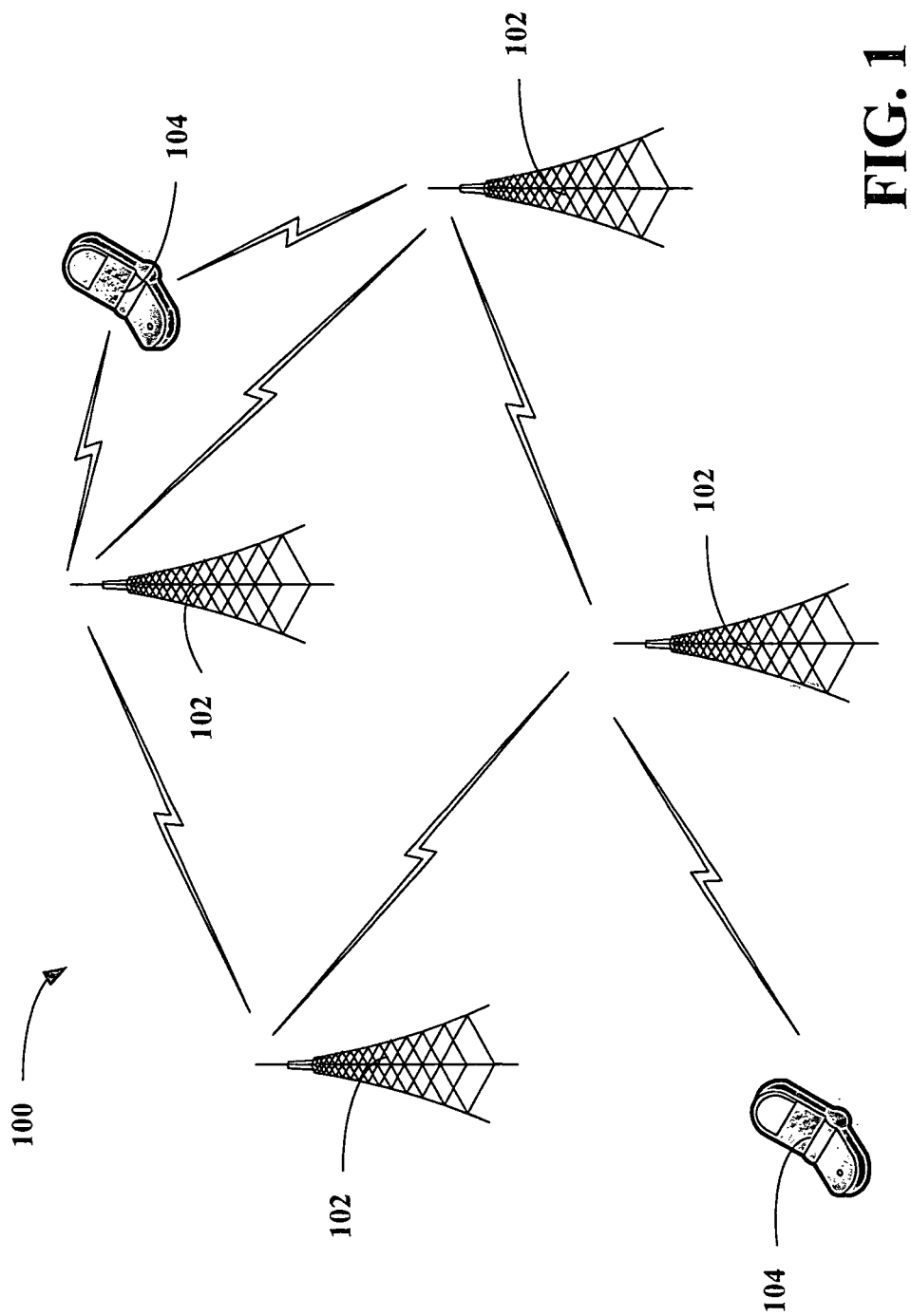
FIG. 1 illustrates a wireless network communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term machine-readable medium" can include, without being limited to, wireless channels and various other media capable of storing, containing, and/or carrying instruction(s) and/or data.

Referring now to FIG. 1, a wireless network communication system 100 is illustrated in accordance with various embodiments presented herein. Network 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demultiplexers, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100.

According to various aspects described herein, when employing a MIMO-MMSE receiver (e.g., in a base station 102 and/or a user device 104), the rank prediction and CQI computation (e.g., for a given rank) can be performed with relative ease. However, when utilizing a list-sphere decoder technique, rank prediction and CQI computation can be more challenging due to the non-linearity of the receiver. Conventional systems and/or methodologies cannot support integration of a list-sphere decoder design in a MIMO system, and thus cannot exploit the performance benefits of a list-sphere decoder design. Various aspects presented herein describe systems and/or methods that can facilitate implementing a list-sphere decoder in a MIMO system to improve system performance. For example, MIMO channel capacity can be utilized as a metric for CQI and rank prediction, based at least in part on an assumption of a sphere decoder gap to capacity, as described in greater detail below.

Figure 2:
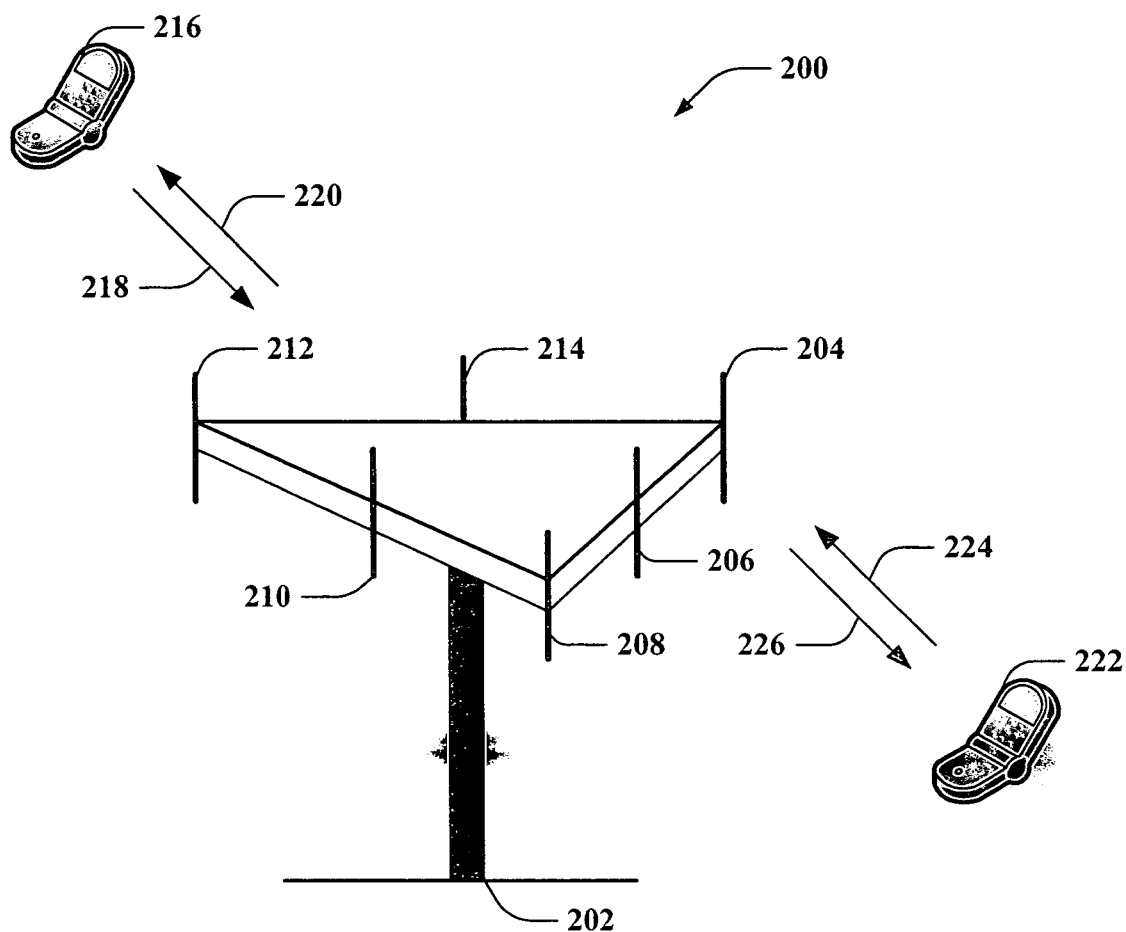
FIG. 2 is an illustration of a multiple access wireless communication system according to one or more embodiments.

Referring now to FIG. 2, a multiple access wireless communication system 200 according to one or more embodiments is illustrated. System 200 is presented for illustrative purposes and can be utilized in conjunction with various aspects set forth below. A 3-sector base station 202 includes multiple antenna groups: one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate is often referred to as a sector of base station 202. In one embodiment, antenna groups each are designed to communicate to mobile devices in a sector of the areas covered by base station 202. In communication over forward links 220 and 226, the transmitting antennas of base station 202 can utilize beam-forming techniques in order to improve the signal-to-noise ratio of forward links for the different mobile devices 216 and 222. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology.

According to one or more aspects, user devices 216 and 222, as well as base station 202, can utilize a single code word (SCW) design with rank prediction in conjunction with a MIMO-MMSE receiver. The utilization of such receivers with a SCW design can facilitate closing a performance gap between an SCW design and a multiple code word (MCW) capacity-achieving design. For instance, a list sphere decoding technique for an SCW design can achieve up to 1.5 dB gain for signal-to-noise ratios (SNRs) lower than 15 dB, and can provide up to 3.5 dB gain for SNRs greater than 20 dB.

A MIMO receiver design can have two modes of operation: single code word (SCW) and multiple-code word (MCW). The MCW mode can be capacity-achieving because the transmitter can encode data transmitted on each spatial layer independently, potentially with different rates. The receiver employs a successive interference cancellation (SIC) algorithm which works as follows: decode a $1^{st}$ layer; subtract its contribution from the received signal after re-encoding; multiply the encoded $1^{st}$ layer with the "estimated channel"; decode the $2^{nd}$ layer and so on. This "onion-peeling" approach means that each successively decoded layer sees increasing SNR and therefore can support higher transmission rates. In the absence of error-propagation, the MCW design with SIC can achieve capacity. However, such a design requires careful management of the rates of each spatial layer due to increased CQI feedback (one CQI for each layer), increased ACK/NACK messaging (one for each layer), complications in hybrid automatic request (HARQ) protocols since each layer can terminate at different transmissions, performance sensitivity of SIC with Doppler and CQI erasures, increased decoding latency requirements since each successive layer cannot be decoded until prior layers are decoded, increased memory requirements at the AT with HARQ since all channels and received signals have to be stored for multiple transmissions, etc., in order to perform interference-cancellation, etc.

Accordingly, a SCW mode design, wherein a transmitter encodes data transmitted on each spatial layer with substantially similar and/or identical data rates, can be a desirable alternative to an MCW design. A number of spatial layers (e.g., rank) is adapted on a packet-by-packet basis, depending on a channel scenario and SNR, to perform rank-prediction. A receiver can employ a low complexity linear receiver such as MMSE for each of a plurality of received tones. The SCW design can thus mitigate the above-mentioned implementation complexities of the MCW design. For instance, since 90% of the users in a WAN environment typically have SNRs<15 dB, the SCW design can be a desirable alternative to an MCW design.

Figure 3:
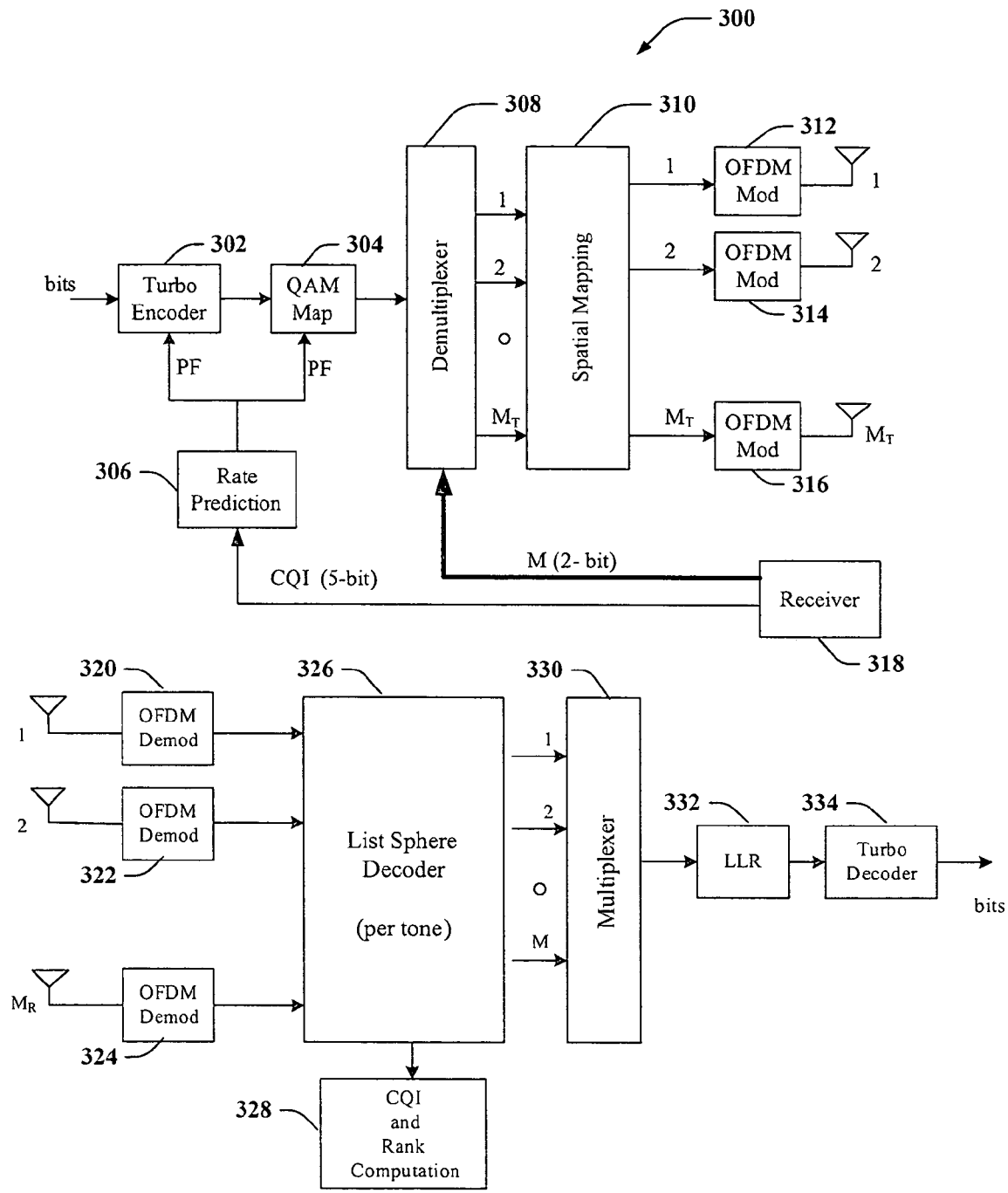
FIG. 3 is an illustration of a system that facilitates performing rank prediction with an SWC transmitter in a wireless device, in accordance with one or more aspects.

FIG. 3 is an illustration of a system 300 that facilitates performing rank prediction with an SWC transmitter in a wireless device, in accordance with one or more aspects. System 300 comprises a turbo encoder 302, a QAM mapping component 304, and a rate prediction component 306 that manipulate received inputs and provide an encoded, mapped signal to a demultiplexer 308. Coded symbols are then demultiplexed by demultiplexer 308 to generate M streams, or layers, such that $1 \leq M \leq \min(M_T, M_R)$, where M is a 2-bit piece of rank information specified in a reverse-link CQI control channel approximately every 5 ms by a receiver 318 via feedback, in addition to a 5-bit CQI feedback signal. The M streams are then spatially mapped by spatial mapping component 310 to $M_T$ antennas, after which the rest of the transmission processing is similar to the SISO design. A plurality of respective OFDM modulators 312, 314, and 316, can then modulate the $M_T$ streams for transmission by the $M_T$ antennas.

Spatial mapping component 310 (e.g., a precoder) can generate an $M_T \times M$ matrix P(k) that maps M symbols onto $M_T$ antennas, for each OFDM tone, k. Spatial mapping component 310 can employ a plurality of options when mapping symbols to antennas. According to an example, an $M_R \times M_T$ MIMO channel H(k) can be considered. Precoder matrices can be chosen so that an equivalent channel matrix H(k)P(k) has improved frequency selectivity compared to H(k). Increased frequency selectivity can be exploited by a decoder to obtain frequency diversity gains.

FIG. 3 further illustrates a number of receive antennas, 1 through $M_R$, each of which is connected to a respective OFDM demodulator 320, 322, and 324, which in turn are coupled to a list-sphere decoder (LSD) 326. LSD 326 can be implemented on a tone-by-tone basis, where for each tone, $M_R$ received signals are processed to generate the log likelihood ratio (LLR) for M symbols, where M is the rank. For example, LSD 326 can provide information to a CQI and rank computation component 328 to facilitate generating a 5-bit CQI report and a 2-bit rank indicator approximately every 5 ms. LSD 326 can additionally provide 1 through M streams of data to a multiplexer 330, which multiplexes the data streams and provides a single signal to an LLR component 332. LLR component 332 then provides a signal with LLR information to a turbo decoder 334, which decodes the data signal.

An MMSE receiver typically used for SCW design is a linear receiver, which decouples a MIMO channel into a number of SISO channels, where the number of SISO channels is equivalent to the rank of the MIMO transmission. In comparison, LSD 326 can utilize a sphere decoding technique that is a low complexity approximation to a maximum life (ML) MIMO decoder (non-linear), and can therefore achieve superior performance compared to a linear MMSE receiver. For an orthogonal channel, the performance of an MMSE receiver and the described LSD 326 can be substantially similar and/or identical to one another. For example, if MR is the number of receive antennas and M is the rank of a given MIMO transmission, then the system equation for a given tone can be defined as:

$$x = Hs + n$$

where H is the MIMO channel per tone ($M_R \times M$), x is the received signal vector per tone ($M_R \times 1$), s is the transmit symbol vector per tone ($M \times 1 = [s_1 s_2 \ldots s_M]$, and where n is the noise vector per tone ($M_R \times 1$).

The ML MIMO solution is given as:

$$\hat{s} = \underset{s \in \Lambda}{\operatorname{argmax}} \| x - Hs \|^2$$

If implemented directly, the complexity is exponential with the number of MIMO layers (M), and the symbol constellation order. However, LSD 326 can approximate the performance of an ML solution, and thus reduce computational complexity. According to an example, the QR decomposition can be defined as: H=QR, where Q is an $M_R \times M$ matrix and R is an upper triangular M×M matrix. The zero-forcing solution can be defined as: $\hat{s} = (H^*H)^{-1}H^*x$ Then:

$$\hat{s}_{ML} = \underset{s \in \Lambda}{\operatorname{argmin}} \| x - Hs \|^2 \quad (1)$$

$$= \underset{s \in \Lambda}{\operatorname{argmin}} [(s - \hat{s})^* H^* H (s - \hat{s}) + x^*(I - H(H^*H)^{-1}H^*)x] \leq$$

$$\underset{s \in \Lambda}{\operatorname{argmin}} (s - \hat{s})^* H^* H (s - \hat{s}) = r^2 \quad (r = \text{sphere radius})$$

$$= \underset{s \in \Lambda}{\operatorname{argmin}} (s - \hat{s})^* R^* R (s - \hat{s})$$

-continued $$= \underset{s \in \Lambda}{\operatorname{argmin}} \sum_{i=1}^{M} R_{ii}^2 \left[ s_i - \hat{s}_i + \sum_{j=i+1}^{M} \frac{R_{ij}}{R_{ii}} (s_j - \hat{s}_j) \right]^2 = r^2$$

Thus, by equation (1), LSD 326 avoids an exhaustive ML search by only looking at the points inside a sphere of radius "r".

LSD component 326 can perform an algorithm as follows. A value i can be set such that i=M. The LHS of equation (1) becomes $R_{MM}^2 \|s_M - \hat{s}_M\|^2$, where $s_M \in \Lambda_M$, which is the constellation used for $M^{th}$ layer. Candidate constellation points can be searched and a candidate constellation point $\bar{s}_M$ can be selected such that $R_{MM}^2 \|\bar{s}_M - \hat{s}_M\|^2 \le r^2$. The value i can then be reset such that i=M−1. The LHS of equation (1) now becomes $$R_{M-1,M-1}^2 \left[ s_{M-1} - \hat{s}_{M-1} + \frac{R_{M-1,M}}{R_{M-1,M-1}} (\bar{s}_M - \hat{s}_M) \right]^2 + R_{MM}^2 \|s_M - \hat{s}_M\|^2,$$

where $\bar{s}_{M-1} \in \Lambda_{M-1}$, which is the constellation used for the $(M-1)^{th}$ layer. For the SCW design, the constellation used for all layers can be the same (e.g., $\Lambda_m = \Lambda$, $\forall m=1,2,\ldots M$). For a given point $\bar{s}_M$, one constellation point, $\bar{s}_{M-1}$, can be selected, such that $$R_{M-1,M-1}^2 \left[ \bar{s}_{M-1} - \hat{s}_{M-1} + \frac{R_{M-1,M}}{R_{M-1,M-1}} (\bar{s}_M - \hat{s}_M) \right]^2 + R_{MM}^2 \|s_M - \hat{s}_M\|^2 \le$$

$r^2$. If no point $\bar{s}_{M-1}$ is available for the choice of $\bar{s}_M$, then i can be reset to equal M and another $\bar{s}_M$ can be selected. For a given pair $\bar{s}_{M-1}$, $\bar{s}_M$, i can be set such that i=M−2 and a point $\bar{s}_{M-2}$ can be selected that falls inside the radius "r". Such acts can be reiterated until one solution vector point $[\bar{s}_M, \bar{s}_{M-1}, \bar{s}_{M-2}, \ldots, \bar{s}_1]$ is obtained.

The LHS of equation (1) can then be re-computed assuming the above obtained vector point, to obtain a new radius $r_{update}$. Then, r can be redefined such that $r \leftarrow r_{update}$, and the foregoing can be reiterated with the new radius r until the ML solution is obtained. It will be appreciated that the sphere radius shrinks with each iteration, and thus only a subset of candidate points need to be evaluated before obtaining an ML solution, thereby providing a faster, more efficient solution than can be obtained using conventional techniques.

LSD 326 can be a MIMO-MAP decoder that generates soft-information for the turbo-decoder, and is based on sphere decoder principles. As in the sphere-decoder technique described above, a sphere radius "r" can be selected, and similar acts can be performed to select a candidate solution vector $[\bar{s}_M, \bar{s}_{M-1}, \bar{s}_{M-2}, \ldots, \bar{s}_1]$ and compute the associated cost given by $$\frac{1}{\sigma^2} \|x - Hs\|^2.$$

A function [candidate, cost] can then be added to the "candidate list". This process can be reiterated until $N_{cand}$ candidate solutions are obtained in the "candidate list". The remaining candidate solution vectors within the radius "r" can be added to the candidate list by replacing the candidate solution vectors with highest costs in the candidate list.

For example, let $M_c$ be the modulation order and let M be the rank of a MIMO transmission. A total of $MM_c$ bits can thus be transmitted in each tone. The soft extrinsic information (e.g., LLR) for each bit $b_k$, $\forall k=1,2 \ldots MM_c$ is approximated as:

$$L_E(b_k|x) \approx \max_{b_k=1} * \left\{ -\frac{1}{\sigma^2} \|x - Hs_{<b_k=1>}\|^2 + b_{[k]}^T \cdot L_{A,[k]} \right\} - \max_{b_k=-1} * \left\{ -\frac{1}{\sigma^2} \|x - Hs_{<b_k=-1>}\|^2 + b_{[k]}^T \cdot L_{A,[k]} \right\}$$

(2)

where: $s_{<b_k=1>} = [s_1 \, s_2 \ldots s_M]_{<b_k=1>}$ includes all the candidate solution vectors with $b_k=1$; $\sigma^2$ is the noise-variance; $b_{[k]} = [b_1 \ldots b_{k-1} \, b_{k+1} \ldots]$ is a sub-vector of bits obtained by excluding $b_k$; $L_{A,[k]} = [L_{A,[1]} \ldots L_{A,[k-1]} \, L_{A,[k+1]} \ldots]$ is a vector of a-priori LLR information on all bits corresponding present in the vector $b_{[k]}$, and where $\max^*(a, b) = \ln(e^a + e^b)$.

Figure 4:
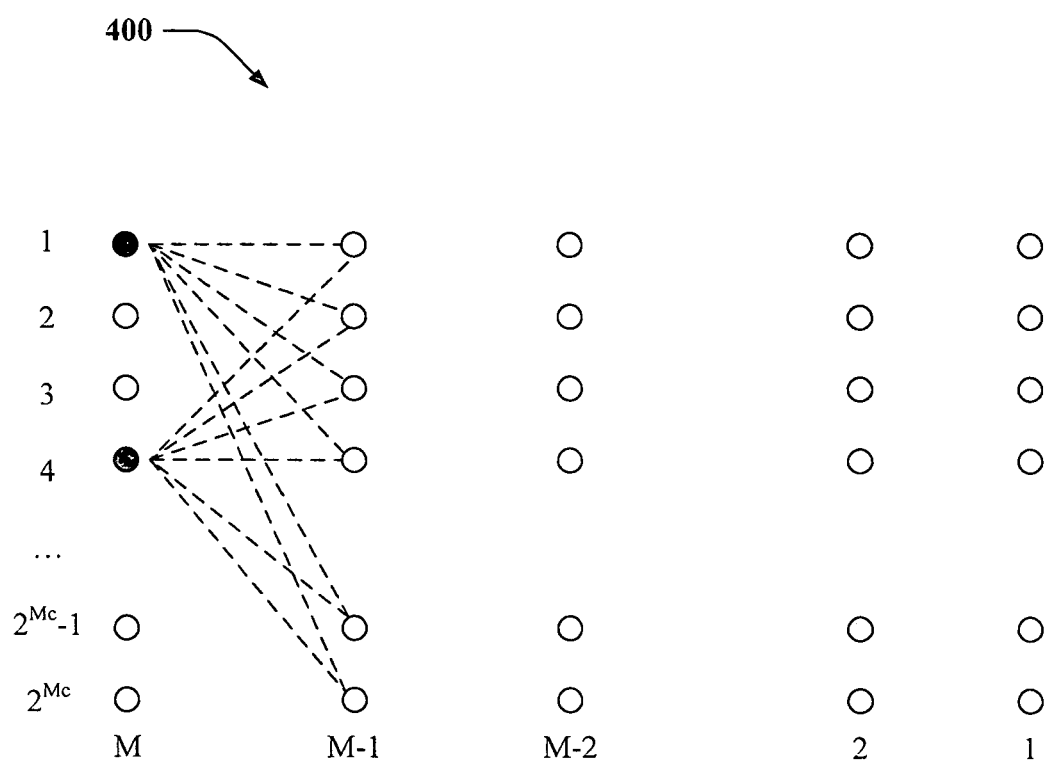
FIGS. 4-6 illustrate a trellis representation of a list-sphere decoding protocol and optimization thereof, in accordance with one or more aspects described herein.
Figure 5:
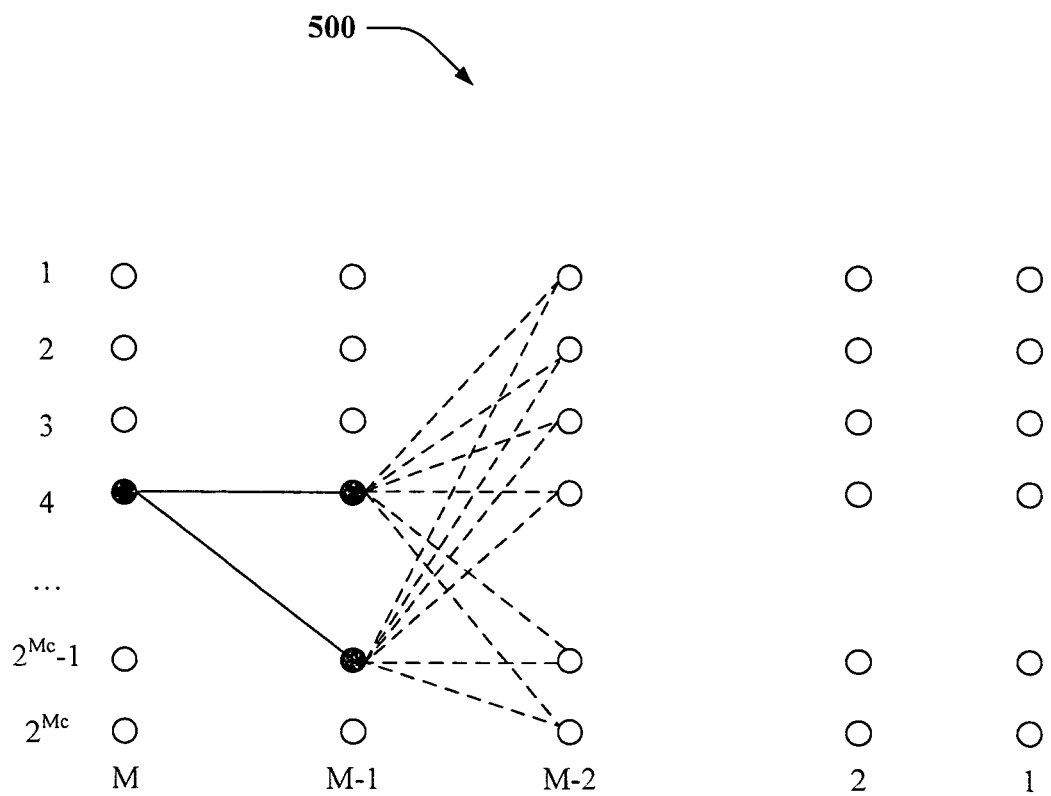
Figure 6:
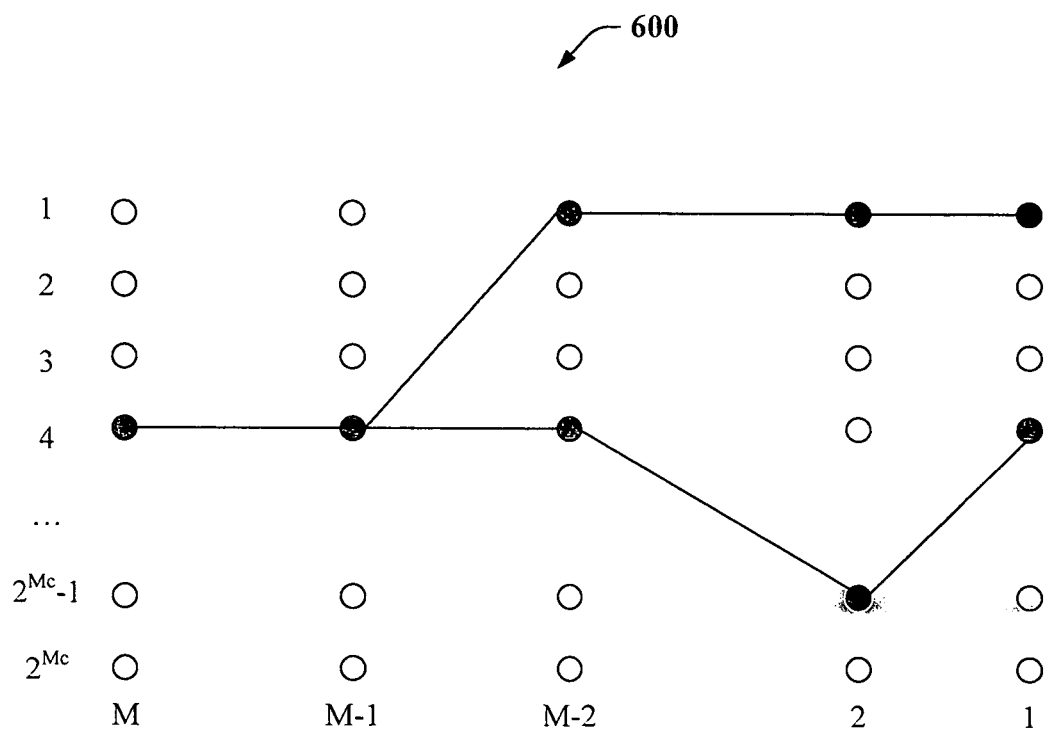

FIGS. 4-6 illustrate a trellis representation of a list-sphere decoder and optimization thereof, in accordance with one or more aspects described herein. With respect to FIG. 4, a trellis representation 400 is illustrated with M stages, corresponding to the rank of the MIMO transmission, and $M_c$ states, corresponding to the number of constellation points. According to an example, for a 16 QAM constellation and Rank 4 transmission, M=4 and $M_c=4$. The optimization parameter that describes a relationship between complexity and performance is $N_{cand}$. To further this example, $N_{cand}=2$ can be defined. A cost function $R_{MM}^2 \|s_M - \hat{s}_M\|^2$ can be evaluated for all constellation points, and $N_{cand}$ points that represent a minimum cost can be preserved. If $N_{cand} > 2^{Mc}$, then $2^{Mc}$ points can be preserved, as indicated by the shaded circles in FIG. 4. For each of the selected points, the cost for $M_c$ candidate constellation points for the $(M-1)^{th}$ rank (layer) can be computed as $$R_{M-1,M-1}^2 \left[ s_{M-1} - \hat{s}_{M-1} + \frac{R_{M-1,M}}{R_{M-1,M-1}} (\bar{s}_M - \hat{s}_M) \right]^2 + R_{MM}^2 \|s_M - \hat{s}_M\|^2.$$

Several candidate pairs $[s_M, s_{M-1}]$ can be generated, as indicated by the dotted lines in the trellis diagram 400. Note that the term $R_{MM}^2 \|s_M - \hat{s}_M\|^2$ is already computed and can be re-used at this point. Furthermore, $$\frac{R_{M-1,M}}{R_{M-1,M-1}} (\bar{s}_M - \hat{s}_M)$$

is computed only $N_{cand}$ times and can be re-used for the remaining computations. These observations reduce overall complexity of the list sphere-decoding algorithm.

Now turning to FIG. 5, a trellis diagram 500 is illustrated that depicts further path selection in accordance with various aspects and in conjunction with FIG. 4. Of the several dotted paths in FIG. 4, only $N_{cand}$ paths have been preserved, as well as the associated constellation points from layers M and M−1, which give the minimum cost as indicated by solid lines in the trellis diagram 500. Such acts can be repeated for all subsequent layers until a final last stage of the trellis (corresponding to layer 1) is reached, each time preserving only $N_{cand}$ paths and the associated constellation points from all previous layers. $N_{cand}$ paths and candidate solution vectors can be selected in this manner, as shown in the final trellis diagram 600 of FIG. 6. Once the candidate solutions and the corresponding cost are obtained, equation (2) can be utilized to obtain the LLR for each bit. The optimization parameter $N_{cand}$ can be varied depending on the constellation size. Furthermore, $N_{cand}$ can be varied across stages.

Figure 7:
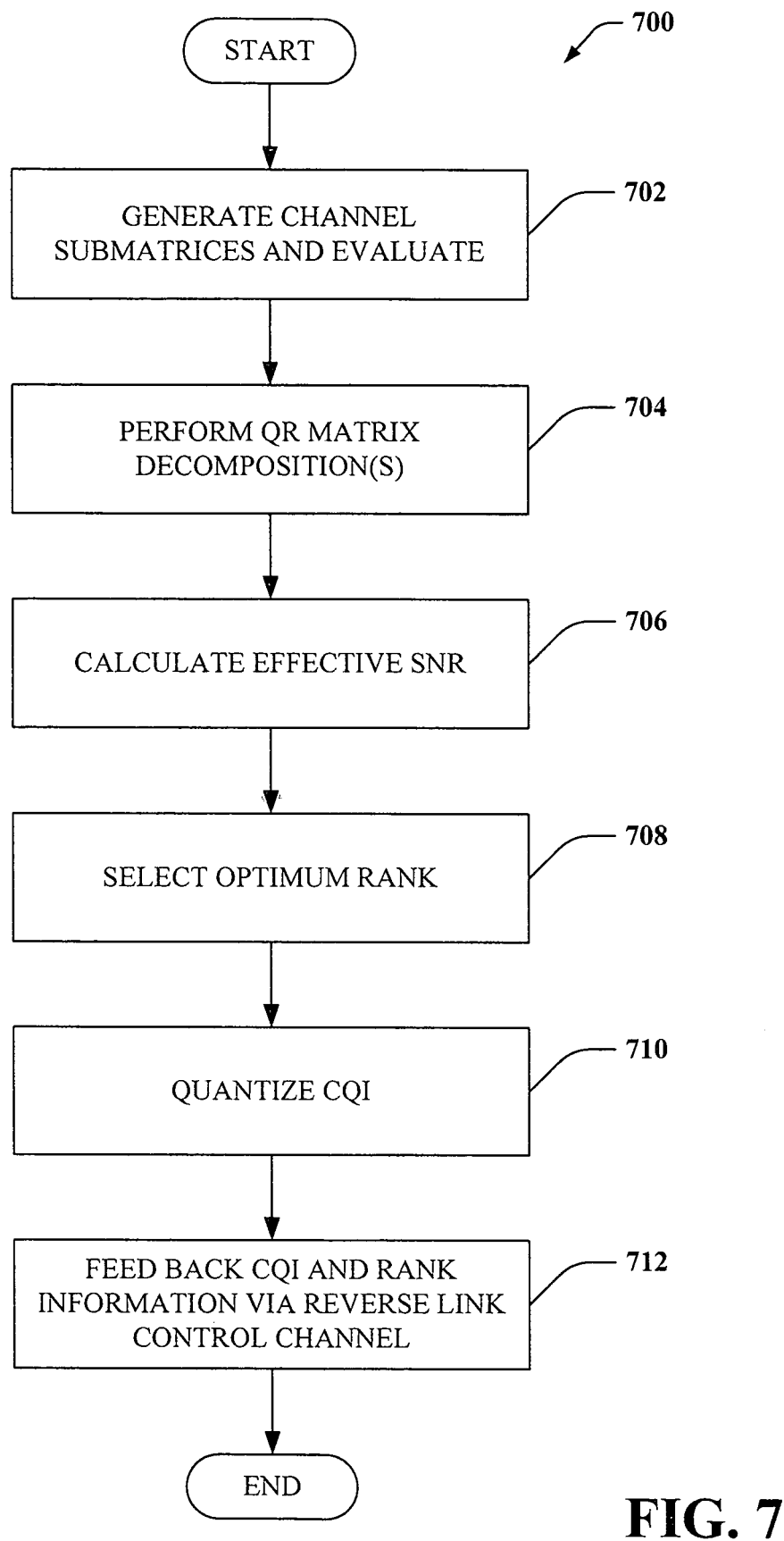
FIG. 7 illustrates a methodology for performing capacity-based rank selection in a non-linear receiver in an access terminal, in accordance with one or more aspects.
Figure 8:
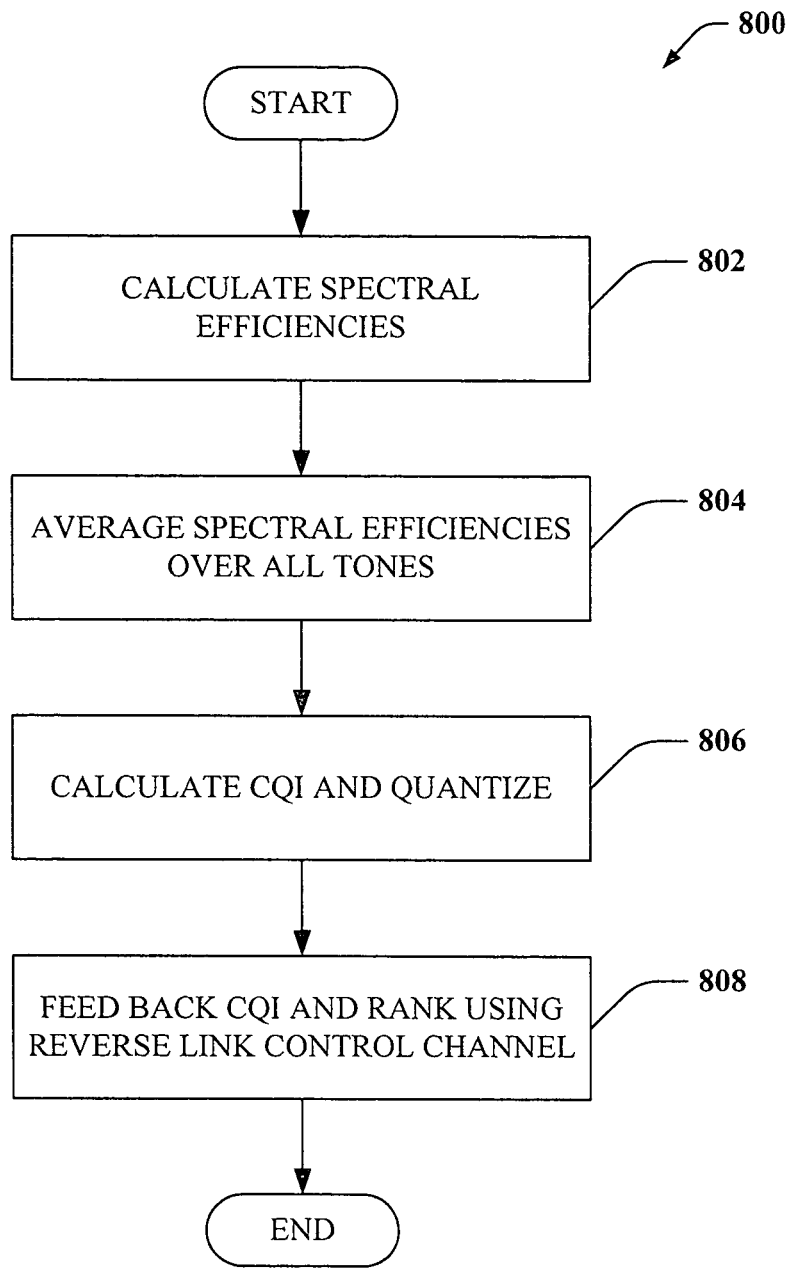
FIG. 8 is an illustration of a methodology for performing maximum rank selection in conjunction with a single code word communication design in a non-linear receiver in an access terminal, in accordance with various aspects set forth herein.
Figure 9:
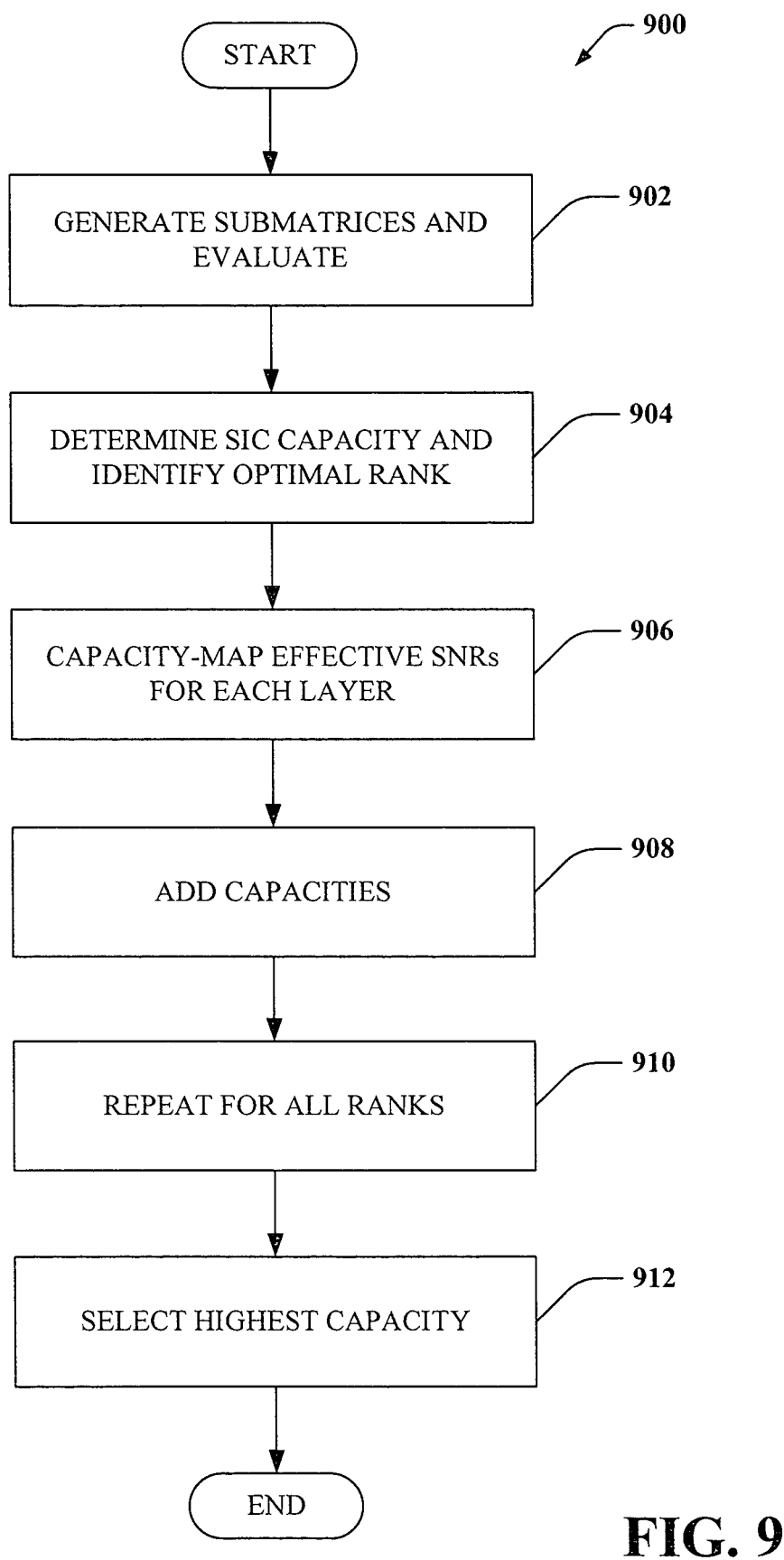
FIG. 9 is an illustration of a methodology for determining rank in a minimum mean-squared error (MMSE)-based non-linear receiver in an access terminal, in accordance with one or more aspects set forth herein.

Referring to FIGS. 7-9, methodologies relating to calculating a transmission rank using a non-linear receiver in an access terminal are illustrated. For example, methodologies can relate to calculating a transmission rank using a non-linear receiver with an SCW protocol in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 7 illustrates a methodology 700 for performing QR-decomposition-based rank selection in a non-linear receiver in a user device, in accordance with one or more aspects. Method 700 is described using a 4-layer transmission, although more or fewer layers may be utilized in conjunction with the systems and methods described herein as will be appreciated by those skilled in the art. From the MIMO channel, 4×1, 4×2, 4×3 and 4×4 channel sub-matrices can be derived, denoted as $\hat{H}(1)=H_{4\times1}, \hat{H}(2)=H_{4\times2}, \hat{H}(3)=H_{4\times3}, \hat{H}(4)=H_{4\times4}$, at 702, and can be evaluated. Matrix evaluation can comprise performing respective Q-R matrix decompositions at 704 to derive:

$$R(1)=QR[H_{4\times1}], R(2)=QR[H_{4\times2}], R(3)=QR[H_{4\times3}], R(4)=QR[H_{4\times4}]$$

Method 700 may be performed by a QRM/list-sphere decoder, such as a MAP/ML decoder, which performs joint processing of all layers and estimates symbols from all layers. Assuming that the symbol estimates from all layers are accurately estimated, an effective SNR calculation may be performed at 706, and expressed as:

$$effSNR[M_{poss}, \sigma^2, k] = \frac{R_{kk}(M_{poss})}{M_{poss}\sigma^2}$$

$$k = 1, 2, \ldots, M_{poss}$$

where $R_{kk}(M_{poss})$ is the (k,k)-th element of the matrix $R(M_{poss})$. The effective SNR computed from the above equation may be average over several tones and symbols in a current Frame, using, for example, a 64-QAM constrained capacity mapping, to give an averaged effective SNR number, denoted as $\overline{effSNR}[M_{poss}]$. At 708, the rank that maximizes capacity may be chosen as the optimum rank, e.g., $$M_{opt} = \underset{j=1,2,\ldots \min(MR,MT)}{\operatorname{argmax}} j \times \operatorname{cap}_{64}[\overline{effSNR[j]}].$$

The spectral efficiency/layer for the MIMO-SCW design may be given as:

$$\overline{C} = \operatorname{cap}_{64}[\overline{effSNR[M_{opt}]}].$$

The CQI (assuming the above rank) for the MIMO-SCW transmission may be quantized, at 710, to the required number of bits as: $CQI=Q[\overline{effSNR[M_{opt}]}]$. The CQI and rank may then be fed-back using the RL-CTRL channel, at 712.

FIG. 8 is an illustration of a methodology 800 for performing maximum rank selection in conjunction with a single code word communication design in a non-linear receiver in a wireless terminal, in accordance with various aspects set forth herein. According the method 800, maximum rank is selected for a MIMO transmission, and code-rate and QAM may be varied to achieve a desired spectral efficiency. At 802, the spectral efficiency for the SCW design is calculated from the MIMO channel as:

$$C = \frac{1}{M}\operatorname{logdet}\left[I + \frac{E_s}{M\Gamma\sigma^2}HH^*\right] bps/\mathrm{Hz}$$

where M is MIMO-SCW transmission rank, $E_s$ is total transmit power across all antennas, $\Gamma$ represents the gap to capacity (e.g., turbo decoder gap, sphere decoder gap, channel estimation loss, . . . ), and $\sigma^2$ is the noise variance per receive antenna. At 804, the spectral efficiency can be averaged across all tones and multiple OFDM symbols in a frame to generate an average spectral efficiency $\overline{C}$. At 806, CQI (e.g., assuming rank 4 in a 4-layer scenario, as described with regard to FIG. 7) for the MIMO-SCW transmission can be calculated by computing the AWGN effective SNR, such that $$\overline{C} = \log\left[1 + \frac{effSNR}{\Gamma}\right]$$

and quantizing it to the required bits such that CQI=Q[effSNR]. It will be appreciated that higher code-rates can be enabled for 4-QAM and 16-QAM systems as opposed to, for instance, a 64-QAM system.

FIG. 9 is an illustration of a methodology 900 for determining rank in an access terminal having a minimum mean-squared error (MMSE)-based non-linear receiver, in accordance with one or more aspects set forth herein. At 902, submatrices for each of a plurality of transmission layers can be generated, as described above. At 904, successive interference cancellation (SIC) capacity for each matrix can be determined. Each layer can be capacity-mapped and an effective SNR can be determined there for at 906. According to an example, it may be determined that rank 2 is optimal in a particular scenario. In such a case, diagonal elements in a matrix for a layer corresponding to rank 2 can be evaluated and averaged. Additionally, an element of a matrix corresponding to a layer of rank 1 can be evaluated, and the capacity there for can be summed with the average of the capacities for the elements of the rank-2 layer (e.g., because such layers are successive). Thus, such capacities can be added at 908, such that total capacity for rank 2 can be equal to the average capacity for all layers of rank 2 plus the capacity of the rank-1 layer. At 910, the method can be repeated for all ranks. At 912, a rank exhibiting the highest overall capacity can be selected. The selected rank can then be returned along with a CQI report approximately every 5 ms as described above.

It will be appreciated that, in accordance with one or more aspects described herein, inferences can be made regarding rank evaluation in a non-linear receiver, when to employ an algorithm associated therewith, whether to employ a non-linear receiver protocol, etc. As used herein, the term to "infer" or "inference" refers generally to the process of reasoning about or inferring states of the system, environment, and/or user from a set of observations as captured via events and/or data. In frence can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding whether to employ a non-linear decoder as described above in a system comprising dual-decoding capabilities, etc. For instance, in a user device that has both a linear decoder and a non-linear decoder, inferences can be made regarding resource availability, computational overhead associated with employing either decoder, signal strength for a received transmission, and/or any other suitable information related to making a determination of whether a linear decoder protocol will suffice to achieve a desired outcome or whether a non-linear decoding scheme is preferable. In such cases, inferences can be made to facilitate preserving system resources, improving a user's communication experience, etc. For example, if battery life is in issue, it may be desirable to forego rank-related protocols in conjunction with a non-linear receiver in order to reduce computational overhead and preserve battery life as long as possible. Conversely, in a case where battery life is not in issue, it can be inferred that utilization of the non-linear receiver is desirable to enhance a communication experience even in the event that greater processing power may be required. It will be appreciated that the foregoing example is illustrative in nature and is not intended to limit the number of inferences that can be made or the manner in which such inferences are made in conjunction with the various embodiments and/or methods described herein.

Figure 10:
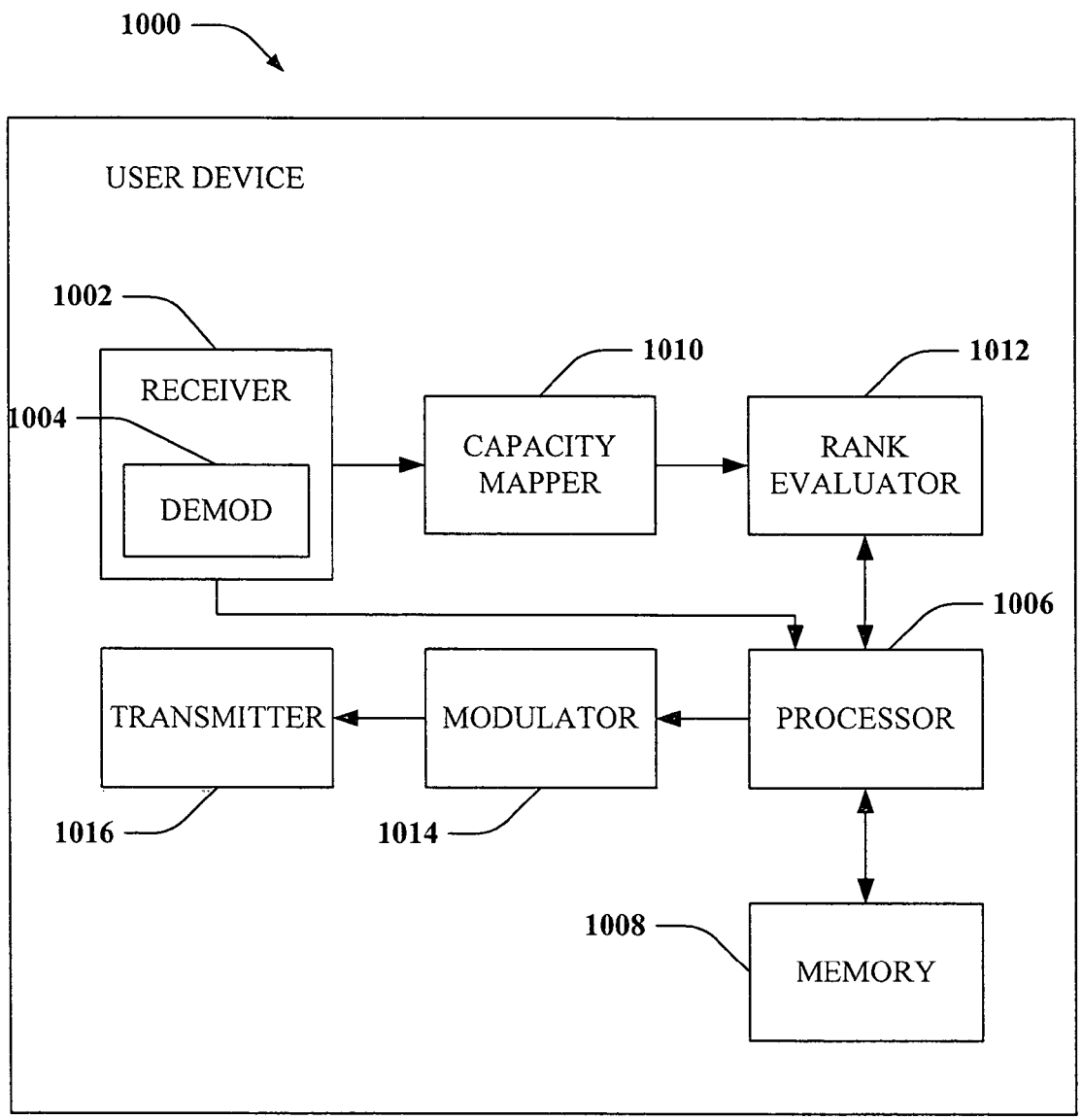
FIG. 10 is an illustration of a user device that facilitates calculating rank of a received transmission layer in a non-linear receiver employed in a wireless communication environment, in accordance with one or more aspects set forth herein.

FIG. 10 is an illustration of a user device 1000 that facilitates calculating rank of a received transmission layer in a non-linear receiver employed in a wireless communication environment, in accordance with one or more aspects set forth herein. User device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be a non-linear receiver, such as a maximum life (ML)-MMSE receiver or the like. A demodulator 1004 can demodulate and provide received pilot symbols to a processor 1006 for channel estimation. Processor 1006 can be a processor dedicated to analyzing information received by receiver 1002 and/or generating information for transmission by a transmitter 1016, a processor that controls one or more components of user device 1000, and/or a processor that both analyzes information received by receiver 1002, generates information for transmission by transmitter 1016, and controls one or more components of user device 1000.

User device 1000 can additionally comprise memory 1008 that is operatively coupled to processor 1006 and that stores information related to calculated ranks for user device 1000, a rank calculation protocol, lookup table(s) comprising information related thereto, and any other suitable information for supporting list-sphere decoding to calculate rank in a non-linear receiver in a wireless communication system as described herein. Memory 1008 can additionally store protocols associated rank calculation, matrix generation, etc., such that user device 1000 can employ stored protocols and/or algorithms to achieve rank determination in a non-linear receiver as described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1006 is further coupled to a capacity-mapping component 1010 that can facilitate mapping a capacity for one or more received layers in order to facilitate rank determination there for. User device can furthermore comprise rank evaluator 1012 that assesses a rank for each received layer as described here with regard to the preceding systems and methods. For instance, rank evaluator 1012 can utilize a capacity-based rank selection algorithm, a maximum rank selection algorithm, or any other suitable rank selection protocol to evaluate rank for a received layer in a non-linear receiver. User device 1000 still further comprises a symbol modulator 1014 and a transmitter 1016 that transmits the modulated signal.

Figure 11:
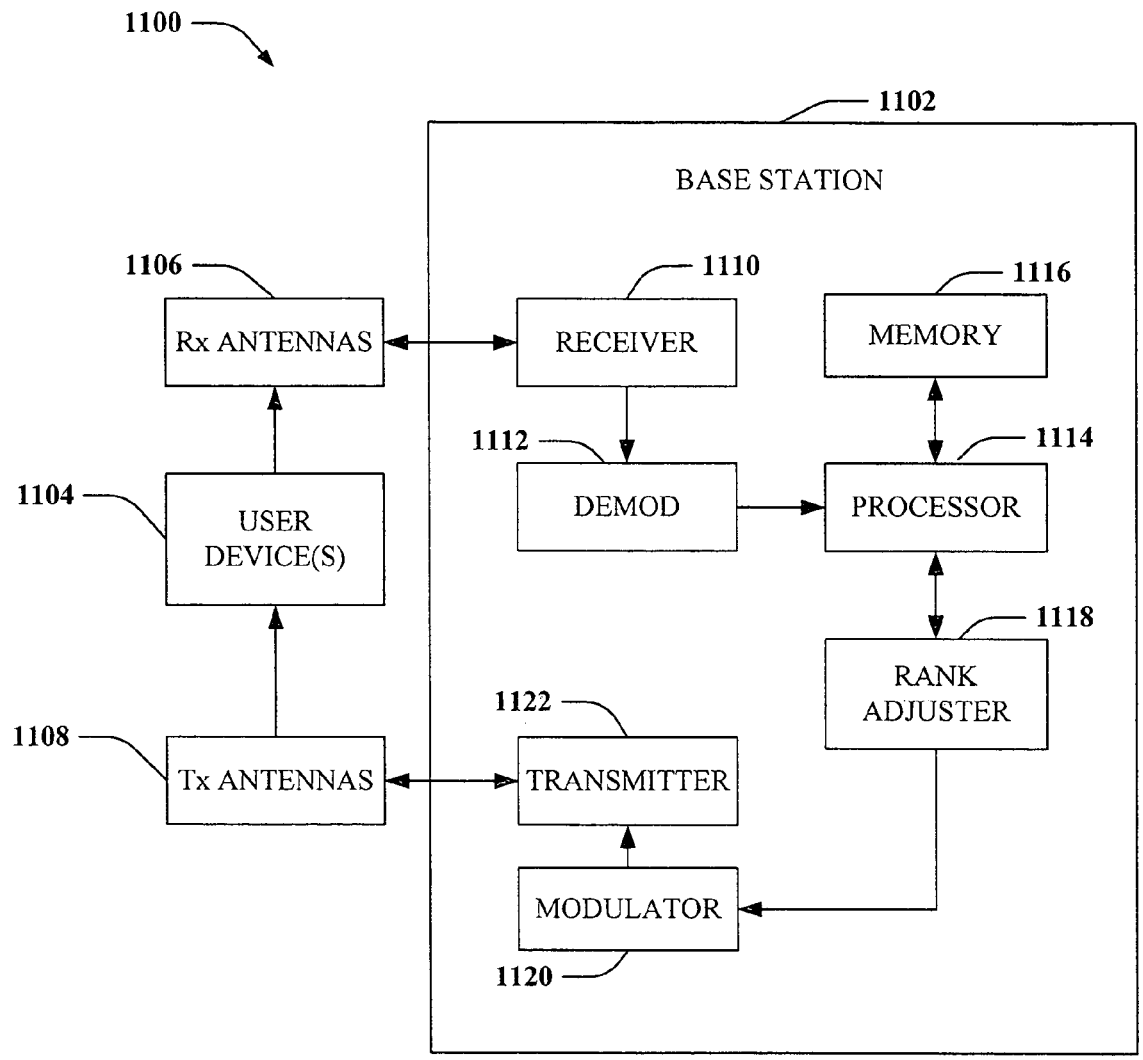
FIG. 11 is an illustration of a system that facilitates updating a rank for a user device that employs a non-linear receiver in a wireless communication environment in accordance with various aspects.

FIG. 11 is an illustration of a system 1100 that facilitates updating a rank for a user device that employs a non-linear receiver in a wireless communication environment in accordance with various aspects. System 1100 comprises a base station 1102 with a receiver 1110 that receives signal(s) from one or more user devices 1104 through a plurality of receive antennas 1106, and a transmitter 1124 that transmits to the one or more user devices 1104 through a transmit antenna 1108. Receiver 1110 can receive information from receive antennas 1106 and is operatively associated with a demodulator 1112 that demodulates received information. Demodulated symbols are analyzed by a processor 1114 that is similar to the processor described above with regard to FIG. 10, and which is coupled to a memory 1116 that stores information related to user ranks, lookup tables related thereto, and/or any other suitable information related to performing the various actions and functions set forth herein. Processor 1114 is further coupled to a rank adjuster 1118 that facilitates updating rank information associated with one or more respective user devices 1104 based on information received with a CQI report. Such information can be received from one or more user devices 1 104 approximately every 5 ms, as is standard interval for CQI report transmissions.

A modulator 1122 can multiplex a signal for transmission by a transmitter 1124 through transmit antenna 1108 to user devices 1104. Rank adjuster 1118 can append information to a signal related to an updated optimum rank for a given transmission stream for communication with a user device 1104, which can be transmitted to user device 1104 to provide an indication that a new optimum channel has been identified and acknowledged. In this manner, base station 1102 can interact with a user device 1104 that provides rank update information and employs a list-sphere decoding protocol in conjunction with a non-linear receiver, such as an ML-MIMO receiver, etc., as described above with regard to the preceding figures.

Figure 12:
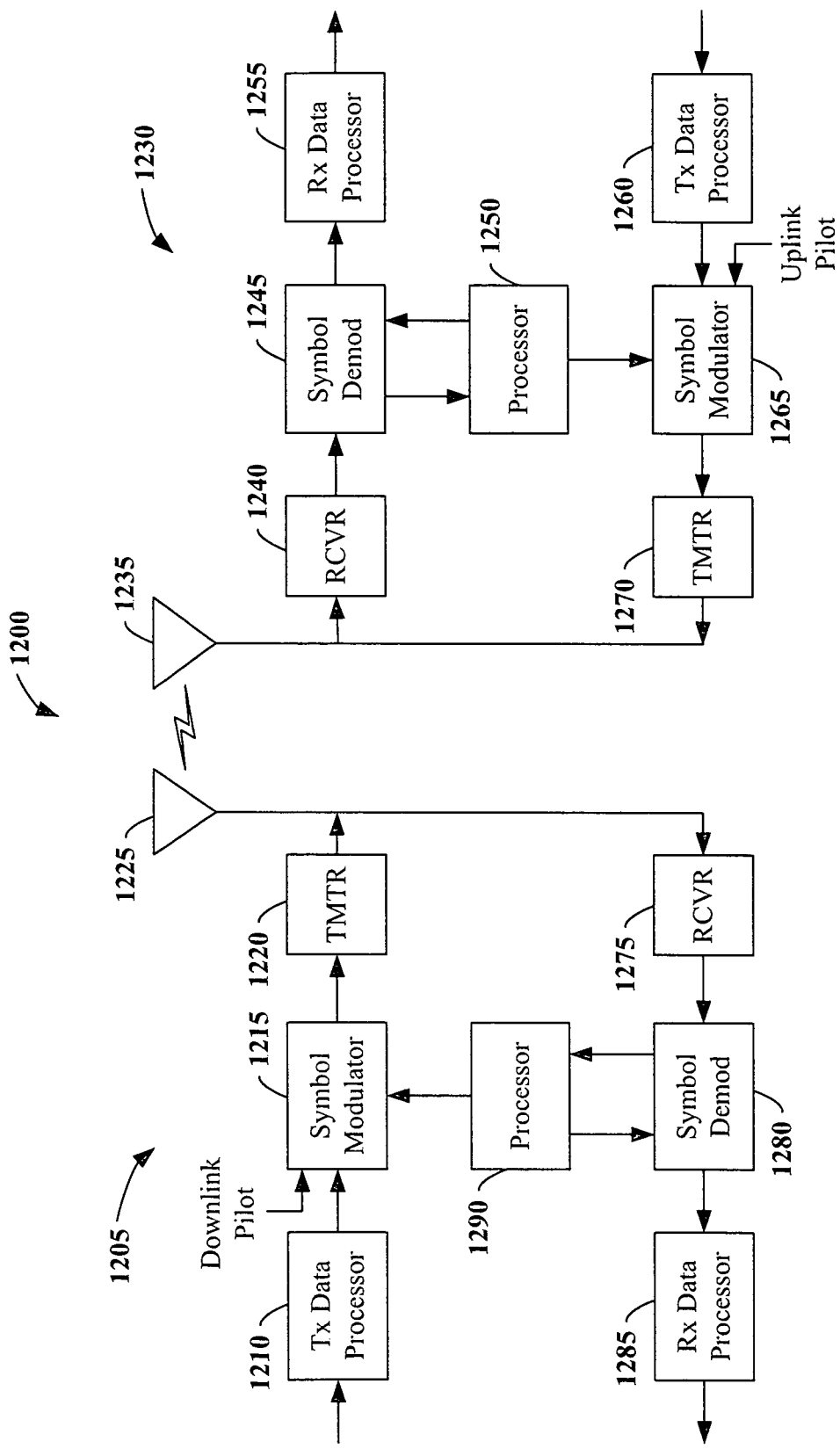
FIG. 12 is an illustration of a wireless network environment that can be employed in conjunction with the various systems and methods described herein.

FIG. 12 shows an exemplary wireless communication system 1200. The wireless communication system 1200 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-6 and 10-11) and/or methods (FIGS. 7-9) described herein to facilitate wireless communication there between.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1220 multiplexes data and pilot symbols and provides them to a transmitter unit (TMTR) 1220. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink. Multiple terminals may transmit pilot concurrently on the uplink on their respective assigned sets of pilot subbands, where the pilot subband sets may be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

Figure 13:
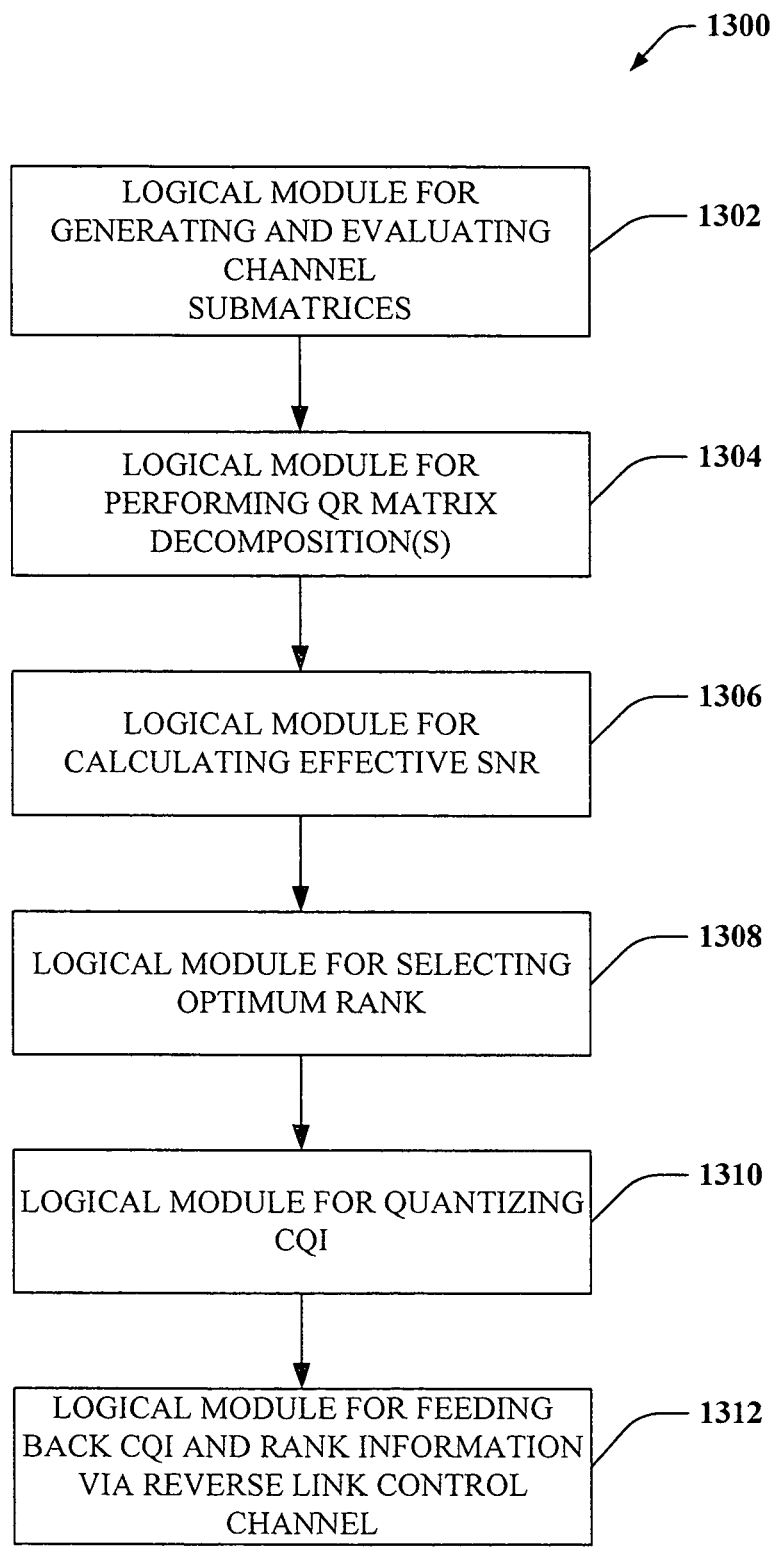
FIG. 13 is an illustration of an apparatus that facilitates performing rank prediction in a non-linear receiver of an access terminal, in accordance with one or more aspects.

FIG. 13 is an illustration of an apparatus 1300 that facilitates performing rank prediction in a non-linear receiver of an access terminal, in accordance with one or more aspects. Apparatus 1300 is represented as a series of interrelated functional blocks, or "modules," which can represent functions implemented by a processor, software, or combination thereof (e.g., firmware). For example, apparatus 1300 may provide modules for performing various acts such as are described above with regard to the preceding figures. Apparatus 1300 comprises a logical module for generating anD evaluating Channel submatrices 1302, which is operatively coupled to a logical module for performing QR matrix decomposition 1304. Apparatus 1300 further comprises a logical module for calculating effective SNR(s) 1306, and a logical module for selecting an optimum rank 1308. Apparatus 1300 still further comprises a logical module for quantizing CQI information 1310 (e.g., quantizing an effective SNR for a selected optimum rank to generate CQI information there for), and a logical module for feeding back CQI and rank information 1312 from the access terminal to an access point, over a reverse link control channel. It is to be understood that apparatus 1300 and the various modules comprised thereby may carry out the methods described above and/or may impart any necessary functionality to the various systems described herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of selecting rank of a non-linear receiver in a user device in a wireless communication environment, the method comprising:
    receiving a transmission signal at a non-linear receiver;
    determining an indication of capacity of the non-linear receiver for each of a plurality of possible ranks of the non-linear receiver, each rank representative of a corresponding number of independent data streams received by the non-linear receiver, wherein determining the indication of capacity for each of the plurality of possible ranks includes computing successive interference cancellation (SIC) capacity for a respective matrix generated for the each of the plurality of possible ranks; and
    selecting a desired rank, of the plurality of ranks, representative of the number of the independent data streams received by the non-linear receiver, whose corresponding capacity is higher than the capacity corresponding to each other rank of the plurality of ranks.

2. The method of claim 1 wherein determining the indication of capacity includes using an effective signal-to-noise ratio.

3. The method of claim 2 wherein determining the indication of capacity includes averaging the effective signal-to-noise ratio over a plurality of tones and symbols of a frame to determine an average effective signal-to-noise ratio.

4. The method of claim 3 further comprising computing an indication of channel quality as a function of the average effective signal-to-noise ratio.

5. The method of claim 4 further comprising quantizing the indication of channel quality and feeding back the quantized indication of channel quality over a reverse link.

6. The method of claim 1 further comprising generating channel sub-matrices and evaluating the channel sub-matrices.

7. The method of claim 6 wherein evaluating the channel submatrices comprises performing respective Q-R matrix decompositions.

8. A user device in a wireless communication environment, the user device comprising:
    a non-linear receiver configured to receive a transmission signal;
    a processor communicatively coupled to the receiver and configured to:
        determine an indication of capacity of the non-linear receiver for each of a plurality of possible ranks of the non-linear receiver, each rank representative of a corresponding number of independent data streams received by the non-linear receiver, wherein the processor configured to determine the indication of capacity for each of the plurality of possible ranks is configured to compute successive interference cancellation (SIC) capacity for a respective matrix generated for the each of the plurality of possible ranks; and
        select a desired rank, of the plurality of ranks, representative of the number of the independent data streams received by the non-linear receiver, whose corresponding capacity is higher than the capacity corresponding to each other rank of the plurality of ranks.

9. The device of claim 8 wherein the processor is configured to determine the indication of capacity using an effective signal-to-noise ratio.

10. The device of claim 9 wherein determining the indication of capacity includes averaging the effective signal-to-noise ratio over a plurality of tones and symbols of a frame to determine an average effective signal-to-noise ratio.

11. The device of claim 10 wherein the processor is further configured to compute an indication of channel quality as a function of the average effective signal-to-noise ratio.

12. The device of claim 11 further comprising a transmitter communicatively coupled to the processor wherein the processor is further configured to quantize the indication of channel quality and feed back the quantized indication of channel quality over a reverse link via the transmitter.

13. The device of claim 8 wherein the processor is further configured to generate channel sub-matrices and evaluate the channel sub-matrices.

14. The device of claim 13 wherein the processor configured to evaluate the channel submatrices is configured to perform respective Q-R matrix decompositions.

15. A user device in a wireless communication environment, the user device comprising:
    means for receiving a transmission signal at a non-linear receiver;
    means for determining an indication of capacity of the non-linear receiver for each of a plurality of possible ranks of the non-linear receiver, each rank representative of a corresponding number of independent data streams received by the non-linear receiver, wherein the means for determining the indication of capacity for each of the plurality of possible ranks include means for computing successive interference cancellation (SIC) capacity for a respective matrix generated for the each of the plurality of possible ranks; and
    means for selecting a desired rank, of the plurality of ranks, representative of the number of the independent data streams received by the non-linear receiver, whose corresponding capacity is higher than the capacity corresponding to each other rank of the plurality of ranks.

16. The device of claim 15 wherein the means for determining the indication of capacity use an effective signal-to-noise ratio.

17. The device of claim 16 wherein determining the indication of capacity includes averaging the effective signal-to-noise ratio over a plurality of tones and symbols of a frame to determine an average effective signal-to-noise ratio.

18. The device of claim 17 further comprising means for computing an indication of channel quality as a function of the average effective signal-to-noise ratio.

19. The device of claim 18 further comprising means for quantizing the indication of channel quality and means for feeding back the quantized indication of channel quality over a reverse link.

20. The device of claim 15 further comprising means for generating channel sub-matrices and means for evaluating the channel sub-matrices.

21. The device of claim 20 wherein the means for evaluating the channel submatrices perform respective Q-R matrix decompositions.

22. A computer program product residing on a tangible non-transitory processor-readable medium and comprising processor-readable instructions configured to cause a processor to:
  determine an indication of capacity of a non-linear receiver for each of a plurality of possible ranks of the non-linear receiver, each rank representative of a corresponding number of independent data streams received by the non-linear receiver, wherein the instructions to cause the processor to determine the indication of capacity for each of the plurality of possible ranks include instructions configured to cause the processor to compute successive interference cancellation (SIC) capacity for a respective matrix generated for the each of the plurality of possible ranks; and
  select a desired rank, of the plurality of ranks, representative of the number of the independent data streams received by the non-linear receiver, whose corresponding capacity is higher than the capacity corresponding to each other rank of the plurality of ranks.

23. The computer program product of claim 22 wherein the instructions configured to cause the processor to determine the indication of capacity are configured to cause the processor to use an effective signal-to-noise ratio.

24. The computer program product of claim 23 wherein the instructions configured to cause the processor to determine the indication of capacity include instructions configured to cause the processor to average the effective signal-to-noise ratio over a plurality of tones and symbols of a frame to determine an average effective signal-to-noise ratio.

25. The computer program product of claim 24 further comprising instructions configured to cause the processor to compute an indication of channel quality as a function of the average effective signal-to-noise ratio.

26. The computer program product of claim 25 further comprising instructions configured to cause the processor to quantize the indication of channel quality and feed back the quantized indication of channel quality over a reverse link.

27. The computer program product of claim 22 further comprising instructions configured to cause the processor to generate channel sub-matrices and evaluate the channel sub-matrices.

28. The computer program product of claim 27 wherein instructions configured to cause the processor to evaluate the channel submatrices are configured to cause the processor to perform respective Q-R matrix decompositions.

* * * * *